United States Patent
Dunne et al.

(10) Patent No.: US 9,584,450 B2
(45) Date of Patent: *Feb. 28, 2017

(54) SENDING AN OUT-OF-FACILITY NOTIFICATION BASED ON AGGREGATED CONTENT FROM A TASK MANAGEMENT SYSTEM

(71) Applicant: International Business Machines Corporation, Armonk, NY (US)

(72) Inventors: Jonathan Dunne, Dungarvan (IE); Jeremiah O'Connor, Roscommon Town (IE); Jeffrey B. Sloyer, Fishersville, VA (US); Ian D. Stewart, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,438

(22) Filed: Jun. 23, 2016

(65) Prior Publication Data

US 2016/0301636 A1    Oct. 13, 2016

Related U.S. Application Data

(63) Continuation of application No. 14/071,066, filed on Nov. 4, 2013, now Pat. No. 9,401,882.

(51) Int. Cl.
*G06F 15/16* (2006.01)
*H04L 12/58* (2006.01)
(Continued)

(52) U.S. Cl.
CPC ........... *H04L 51/043* (2013.01); *G06Q 10/103* (2013.01); *G06Q 50/01* (2013.01);
(Continued)

(58) Field of Classification Search
CPC .... H04L 12/58; H04L 12/5855; H04L 12/581; H04L 12/585; G06Q 10/107
(Continued)

(56) References Cited

U.S. PATENT DOCUMENTS 6,832,245 B1 * 12/2004 Isaacs .................. G06Q 10/107
                                                        709/206
7,035,865 B2 * 4/2006 Doss .................... G06Q 10/109
(Continued)

OTHER PUBLICATIONS

Anonymous, "Self enabling 'out of office' notification agent," IP.com Prior Art Database, Technical Disclosure No. IPCOM000215986D, Mar. 15, 2012, 2 pg.
(Continued)

*Primary Examiner* — Vivek Srivastava
*Assistant Examiner* — Atta Khan
(74) *Attorney, Agent, or Firm* — Cuenot, Forsythe & Kim, LLC

(57) ABSTRACT

Historical content corresponding to activity of a user in at least one social networking service is aggregated. The historical content indicates a plurality of collaboration partners with whom the user collaborated via the at least one social networking service in an occupation context. Based on the aggregated historical content, at least one of the collaboration partners can be identified as at least one priority collaboration partner. Whether the user currently is not in a facility where the user works can be automatically determined. Responsive to determining that the user is not in the facility where the user works, a message indicating that the user is not in the facility where the user works can be automatically sent to the at least one priority collaboration partner.

14 Claims, 3 Drawing Sheets

(51) Int. Cl.
*H04L 29/08* (2006.01)
*G06Q 10/10* (2012.01)
*G06Q 50/00* (2012.01)

(52) U.S. Cl.
CPC .............. *H04L 51/02* (2013.01); *H04L 51/32* (2013.01); *H04L 67/18* (2013.01); *H04L 67/22* (2013.01)

(58) Field of Classification Search
USPC ........................................................ 709/206
See application file for complete search history.

(56) References Cited

U.S. PATENT DOCUMENTS

| | | | |
|---|---|---|---|
| 8,166,121 B2 | 4/2012 | Farrell et al. | |
| 2006/0277548 A1* | 12/2006 | Abe .................. | G06F 9/4843 718/104 |
| 2008/0127231 A1* | 5/2008 | Shaffer .............. | G06Q 10/109 719/328 |
| 2008/0313004 A1* | 12/2008 | Ryan ............... | G06Q 10/063116 705/7.17 |
| 2010/0235367 A1* | 9/2010 | Chitiveli .......... | G06F 17/30707 707/752 |
| 2011/0004503 A1* | 1/2011 | Farrell .............. | G06Q 10/109 705/7.18 |
| 2011/0035443 A1* | 2/2011 | Jensen .............. | H04W 4/20 709/204 |
| 2011/0047479 A1* | 2/2011 | Ghosh .............. | G06Q 10/109 715/747 |
| 2011/0185006 A1* | 7/2011 | Raghav ............. | G06Q 10/107 709/201 |
| 2011/0231407 A1* | 9/2011 | Gupta ............... | H04M 1/274583 707/748 |
| 2011/0269439 A1 | 11/2011 | Griffin | |
| 2014/0006078 A1* | 1/2014 | McGauley .......... | G06Q 10/06 705/7.15 |
| 2015/0127751 A1 | 5/2015 | Dunne et al. | |

OTHER PUBLICATIONS

Van Grove, J., "Twitter to Facebook—5 Ways to Post to Both," [online] Mashable.com, May 25, 2009 [retrieved Aug. 5, 2013], Mashable, Inc. © 2005-02013, retrieved from the Internet: <http://mashable.com/2009/05/25/twitter-to-facebook>, 6 pg.

"Centralized Status Updation, Ping.FM (Review)" [online] TechCrunch.com, Apr. 4, 2010 [retrieved Nov. 4, 2013] retrieved from the Internet: <http://web.archive.org/web/20110129030010/http://www.urdoogle.com/2010/04/04/centralized-status-updation-ping-fm>, 4 pg.

U.S. Appl. No. 14/071,066, Non-Final Office Action, Oct. 29, 2014, 12 pg.

U.S. Appl. No. 14/071,066, Final Office Action, May 7, 2015, 15 pg.

U.S. Appl. No. 14/071,066, Advisory Action, Aug. 14, 2015, 4 pg.

U.S. Appl. No. 14/071,066, Non-Final Office Action, Sep. 24, 2015, 27 pg.

U.S. Appl. No. 14/071,066, Notice of Allowance, Apr. 25, 2016, 17 pg.

* cited by examiner

US 9,584,450 B2

SENDING AN OUT-OF-FACILITY NOTIFICATION BASED ON AGGREGATED CONTENT FROM A TASK MANAGEMENT SYSTEM

BACKGROUND

Arrangements described herein relate to unavailability notifications.

Collaboration among co-workers is a fundamental requirement in today's business environment. Nearly all leading businesses endorse the value of high-performance teams collaboratively working together. Oftentimes, however, team members are dispersed in different locations. Technological innovations developed in recent decades, such as the Internet, network based collaboration systems, voice conferencing systems, video conferencing systems, etc., allow such team members to collaborate from disparate locations. Still, team members generally need to know the availability of other team members in order to participate in collaborative working sessions with the other team members.

SUMMARY

A method includes aggregating historical content corresponding to activity of a user in at least one social networking service, wherein the historical content indicates a plurality of collaboration partners with whom the user collaborated via the at least one social networking service in an occupation context. Based on the aggregated historical content, using a processor, at least one of the collaboration partners can be identified as at least one priority collaboration partner. Whether the user currently is not in a facility where the user works can be automatically determined. Responsive to determining that the user is not in the facility where the user works, a message indicating that the user is not in the facility where the user works can be automatically sent to the at least one priority collaboration partner.

A system includes a processor programmed to initiate executable operations. The executable operations include aggregating historical content corresponding to activity of a user in at least one social networking service, wherein the historical content indicates a plurality of collaboration partners with whom the user collaborated via the at least one social networking service in an occupation context. Based on the aggregated historical content, at least one of the collaboration partners can be identified as at least one priority collaboration partner. Whether the user currently is not in a facility where the user works can be automatically determined. Responsive to determining that the user is not in the facility where the user works, a message indicating that the user is not in the facility where the user works can be automatically sent to the at least one priority collaboration partner.

A computer program includes a computer readable storage medium having program code stored thereon. The program code is executable by a processor to perform a method. The method includes aggregating, by the processor, historical content corresponding to activity of a user in at least one social networking service, wherein the historical content indicates a plurality of collaboration partners with whom the user collaborated via the at least one social networking service in an occupation context. Based on the aggregated historical content at least one of the collaboration partners can be identified, by the processor, as at least one priority collaboration partner. Whether the user currently is not in a facility where the user works can be automatically determined by the processor. Responsive to determining that the user is not in the facility where the user works, a message indicating that the user is not in the facility where the user works can be automatically sent, by the processor, to the at least one priority collaboration partner.

DETAILED DESCRIPTION

Figure 1:
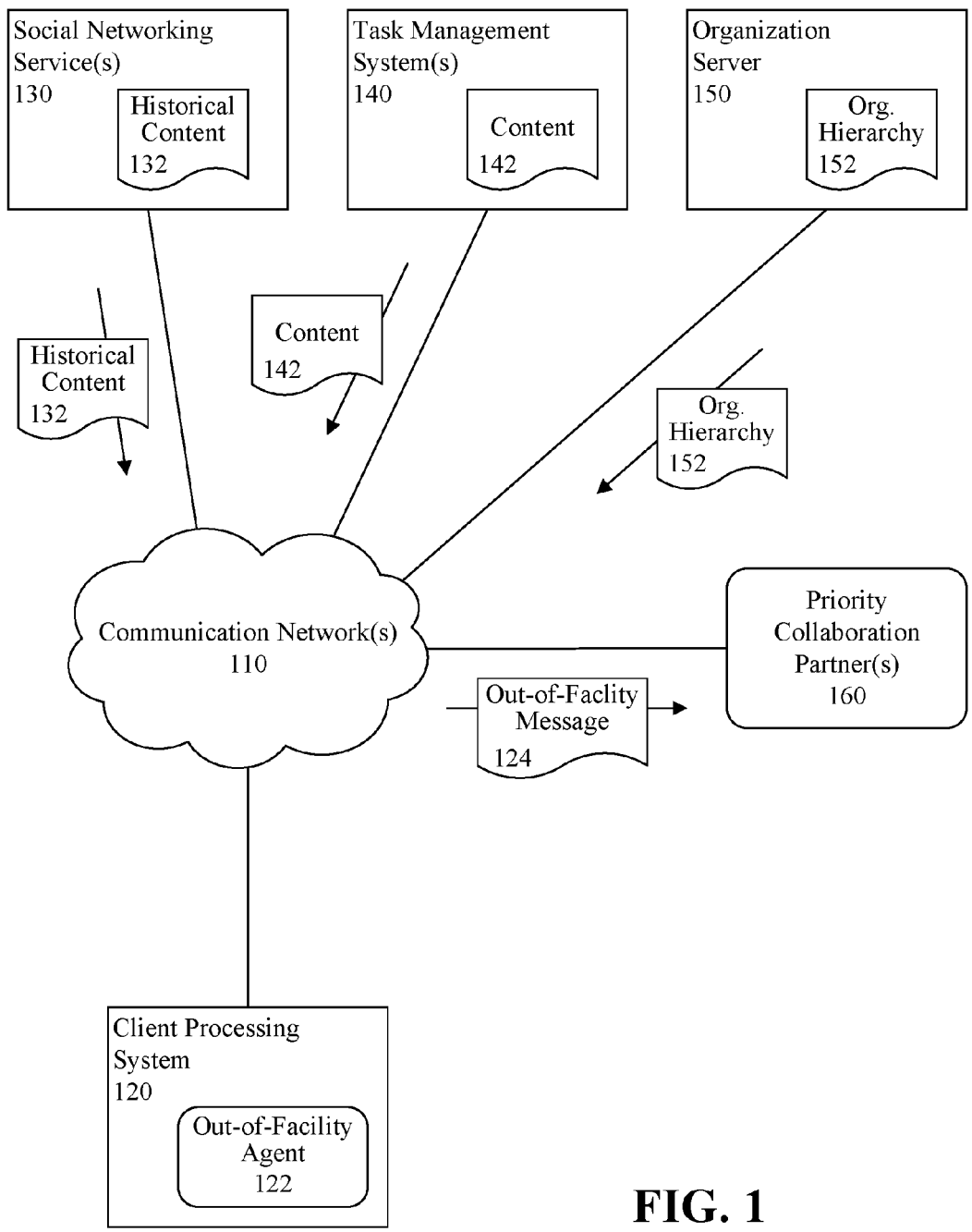
FIG. 1 is a block diagram illustrating an example of a communication system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to sending an out-of-facility notification based on social networking service content. In accordance with the inventive arrangements disclosed herein, historical content corresponding to activity of a user in at least one social networking service can be aggregated. The historical content can indicate a plurality of collaboration partners with whom the user collaborated via the at least one social networking service in an occupation context. Based on the aggregated historical content, at least one of the collaboration partners can be identified as a priority collaboration partner. A determination automatically can be made as to whether the user currently is not in a facility where the user works. Responsive determining that the user currently is not in the facility where the user works, a message indicating that the user is not in the facility automatically can be sent to the priority collaboration partner.

Several definitions that apply throughout this document now will be presented.

As defined herein, the term "social networking service" means a service via which users socially interact via a social networking website and/or a social networking application. As defined herein, a social networking service is not an e-mail service. A system may provide both e-mail services and social networking services but, nonetheless, social networking services are distinct from e-mail services.

As defined herein, the term "task management system" means a system that manages tasks performed by, or to be performed by, a user. As defined herein, a task management system is not an e-mail service. A system may provide both e-mail services and task management but, nonetheless, task management is distinct from e-mail services.

As defined herein, the term "facility" means a structure in which at least one person works. Examples of a facility include, but are not limited to, an office, a mobile office and a factory.

As defined herein, the term "historical content" means data that at least indicates a person's use of a social networking service to communicate with at least one other person.

As defined herein, the term "occupation" means a person's job or profession.

As defined herein, the term "occupation context" means in relation to a person's occupation. In illustration, if a user accesses a social networking service to communicate with a collaboration partner, who is associated with the user's occupation, about a project or issue the user is working on as part of the user's occupation, such communication via the social networking system is considered to be performed in an occupation context. If, however, a user merely communicates in a social networking system to other people about his/her occupation, and those people are not associated with the user's occupation, such communication is not a communication in an occupation context.

As defined herein, the term "automatically" means without user intervention.

As defined herein, the term "user" means a person (i.e., a human being).

As defined herein, the term "partner" means a person (i.e., a human being).

As defined herein, the term "computer readable storage medium" means a storage medium that contains or stores program code for use by or in connection with an instruction execution system, apparatus, or device. As defined herein, a "computer readable storage medium" is not a transitory propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a field-programmable gate array (FPGA) and a controller.

FIG. 1 is a block diagram illustrating an example of a communication system 100 (hereinafter "system"). The system 100 can include one or more communication networks 110. The communication network(s) 110 may include connections, such as wire, wireless communication links, and/or fiber optic cables. The communication network(s) 110 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), and/or the like. In this regard, the communication network(s) 110 can include one or more trunk lines, routers, switches, transceivers and/or the like.

The system 100 also can include a client processing system (hereinafter "client") 120, which includes a processor and memory. Examples of the client 120 include, but are not limited to, a computer (e.g., a desktop computer, a workstation, a notebook computer, a laptop computer, a tablet computer, a netbook, etc.), a smart phone, or any other system, device or apparatus configured to support user interactions with at least one social networking service 130, at least one task management system 140 and/or at least one organization server 150 hosting an organization hierarchy 152.

The client 120 can include an out-of-facility agent (hereinafter "agent") 122, implemented as computer program code and executed by the processor of the client 120, which sends an out-of-facility message 124, on behalf of a user, to at least one priority collaboration partner 160. In another arrangement, the agent 122 can be implemented as computer program code executed by another processing system (e.g., a server or other client processing system), including at least one processor and memory and communicatively linked to the client 120, which sends the out-of-facility message 124, on behalf of the user, to at least one priority collaboration partner 160.

Selection of the priority collaboration partner 160 can be based, and least in part, on aggregated historical content 132 acquired from one or more social networking services 130 and/or content 142 acquired from one or more task management systems 140. In one aspect, selection of the priority collaboration partner 160 also can be based, and least in part, on an organizational hierarchy 152 of an organization with which the user for whom the out-of-facility message 124 is being sent is associated.

In operation, the agent 122 can communicate with the social networking service(s) 130 to aggregate the historical content 132. In one arrangement, the agent 122 can submit one or more queries to the social networking service(s) 130 and, responsive the query or queries, the social networking service(s) 130 can communicate the historical content 132 to the agent 122. The historical content 132 can indicate a plurality of collaboration partners with whom the user collaborated via the social networking service(s) 130 in an occupation context. Such collaboration can include, for example, communications sent by, or received by, the user in the social networking service(s) 130 in an occupation context. The historical content 132 also can indicate when such communications occurred between the user and collaboration partners. Optionally, the historical content 132 also can include the subject of such communications and/or content contained in such communications.

Based at least on the aggregated historical content 132, the agent 122 can identify one or more collaboration partners as priority collaboration partners 160. In illustration, the agent 122 can statistically analyze the historical content 132 to identify at least one collaboration partner with whom the user has been recently, and frequently, communicating with via the social networking service(s) 130 in an occupation context, and generate a corresponding statistical analysis. For example, the agent can analyze communications sent by the user to collaboration partners and/or communications received by the user from collaboration partners.

Further, the agent 122 can communicate with the task management system(s) 140 to aggregate the content 142. The content 142 can indicate tasks assigned to the user and one more collaboration partners associated with the tasks. In context of the content 142, a collaboration partner can be a person who is identified as being associated with the task (e.g., a person who is to contribute to task), a person who is to monitor the user and/or results from the task, a person who is affected by results of the task, and/or any other person who has interest in, or is affected by, results of the task and/or whether the task is performed. The content 142 also can be analyzed and corresponding results can be included in the statistical analysis.

The agent 122 further can analyze the organizational hierarchy 152 to identify one or more collaboration partners based on, at least in part, the position of the user and positions collaboration partners in the organizational hierarchy. For example the agent 122 can identify collaboration partners who are on the same level as the user in the organizational hierarchy 152, who are above the user in the organizational hierarchy 152, who are below the user in the organizational hierarchy 152, who are assigned to the same team/department as the user in the organization hierarchy 152, who are assigned to a different team/department from the user in the organization hierarchy 152, etc. Results from the analysis of the organizational hierarchy 152 also can be included in the statistical analysis.

Based on the statistical analysis, the agent 122 can identify one or more of the collaboration partners as being priority collaboration partners 160. As noted, the priority collaboration partners 160 can be those collaboration partners with whom the user has recently and/or frequently communicated in an occupation context. In one arrangement, however, the priority collaboration partners 160 may be limited to those collaboration partners sharing tasks with the user in the task management system 140. Moreover the priority collaboration partners 160 also may be limited to those who are in a particular portion of the organizational hierarchy 152, for instance those who are in the same department as the user in the organizational hierarchy 152, those who are at a same organizational level as the user in the organizational hierarchy 152, those who are above the user in the in the organizational hierarchy 152, those who are below the user in the organizational hierarchy 152, etc.

In one aspect, parameters that define who may be considered as priority collaboration partners 160 can be specified by the user. For example, via the agent 122, the user can specify parameters relating to the historical content 132, the content 142 and the organizational hierarchy 152 that are used by the agent 122 to identify priority collaboration partners 160 from among the collaboration partners.

In one arrangement, the agent 122 can continually or periodically monitor the historical content 132, the content 142 and/or the organizational hierarchy 152 to identify one or more priority collaboration partners 160 from among the collaboration partners. In another arrangement, the agent 122 can obtain the historical content 132, the content 142 and/or the organizational hierarchy 152 when the agent 122 determines that the user is not in a facility where the user works.

The agent 122 can automatically determine whether the user currently is not in the facility where the user works. For example, the agent 122 can determine whether the user has not logged into the client 120, whether the user has not logged into the social networking service(s) 130, whether the user has not posted any posts in the social networking service(s) 130, whether the user has not logged into the task management system(s) 140 and/or whether the user has not posted any posts in the task management system(s) 140.

Responsive to determining that the user is not in the facility where the user works, the agent 122 can automatically send to the identified priority collaboration partner(s) the out-of-facility message 124 indicating that the user is not in the facility. For example, the agent 122 can automatically communicate the out-of-facility message 124 to the priority collaboration partner(s) 160 via the social networking service(s) 130, via e-mail, via text messaging, or via any other suitable communication means.

Figure 2:
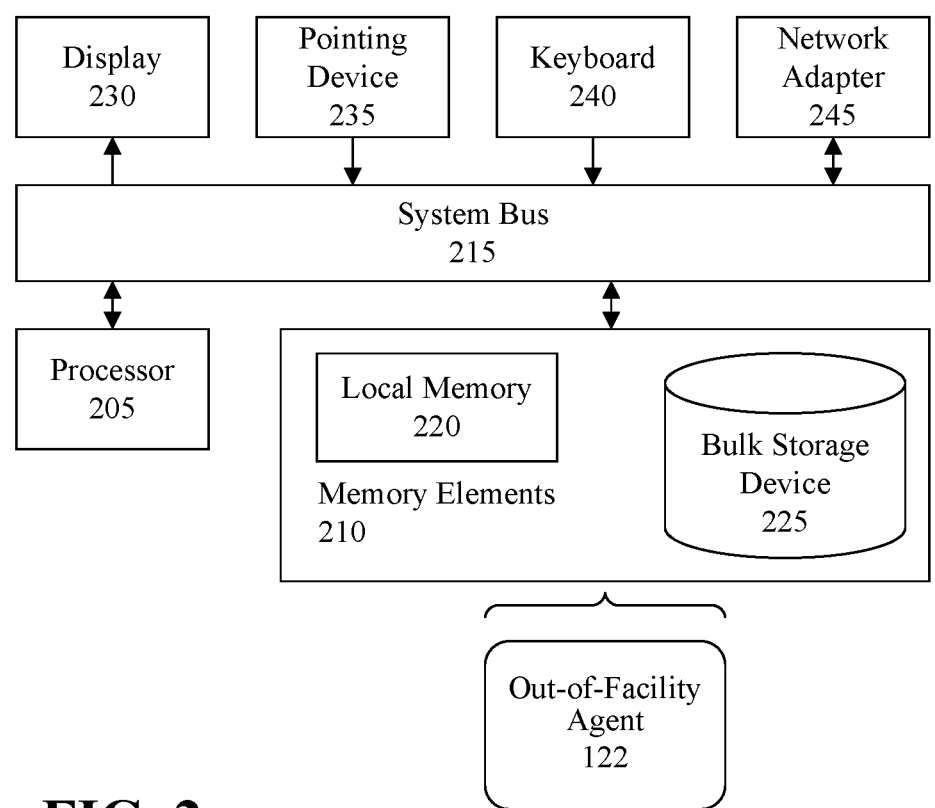
FIG. 2 is a block diagram illustrating example architecture for a client processing system.

FIG. 2 is a block diagram illustrating example architecture for the client processing system 120 of FIG. 1. The client processing system 120 can include at least one processor 205 coupled to memory elements 210 through a system bus 215 or other suitable circuitry. As such, the client processing system 120 can store program code within the memory elements 210. The processor 205 can execute the program code accessed from the memory elements 210 via the system bus 215. It should be appreciated that the client processing system 120 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The client processing system 120 also can include one or more cache memories (not shown) that provide temporary storage of at least some program code in order to reduce the number of times program code must be retrieved from the bulk storage device 225 during execution.

Input/output (I/O) devices such as a display 230, a pointing device 235 and a keyboard 220 optionally can be coupled to the client processing system 120. The I/O devices can be coupled to the client processing system 120 either directly or through intervening I/O controllers. For example, the display 230 can be coupled to the client processing system 120 via a graphics processing unit (GPU), which may be a component of the processor 205 or a discrete device. One or more network adapters 245 also can be coupled to client processing system 120 to enable client processing system 120 to become coupled to other systems, computer systems, remote printers, and/or remote storage devices through intervening private or public networks. Modems, cable modems, transceivers, and Ethernet cards are examples of different types of network adapters 245 that can be used with client processing system 120.

As pictured in FIG. 2, the memory elements 210 can store the out-of-facility agent 122 depicted in FIG. 1. Being implemented in the form of executable program code, the out-of-facility agent 122 can be executed by the client processing system 120 (e.g., by the processor 205) and, as such, can be considered part of the client processing system 120. Moreover, the out-of-facility agent 122 is a functional data structure that imparts functionality when employed as part of the client processing system 120 of FIGS. 1 and 2.

Figure 3:
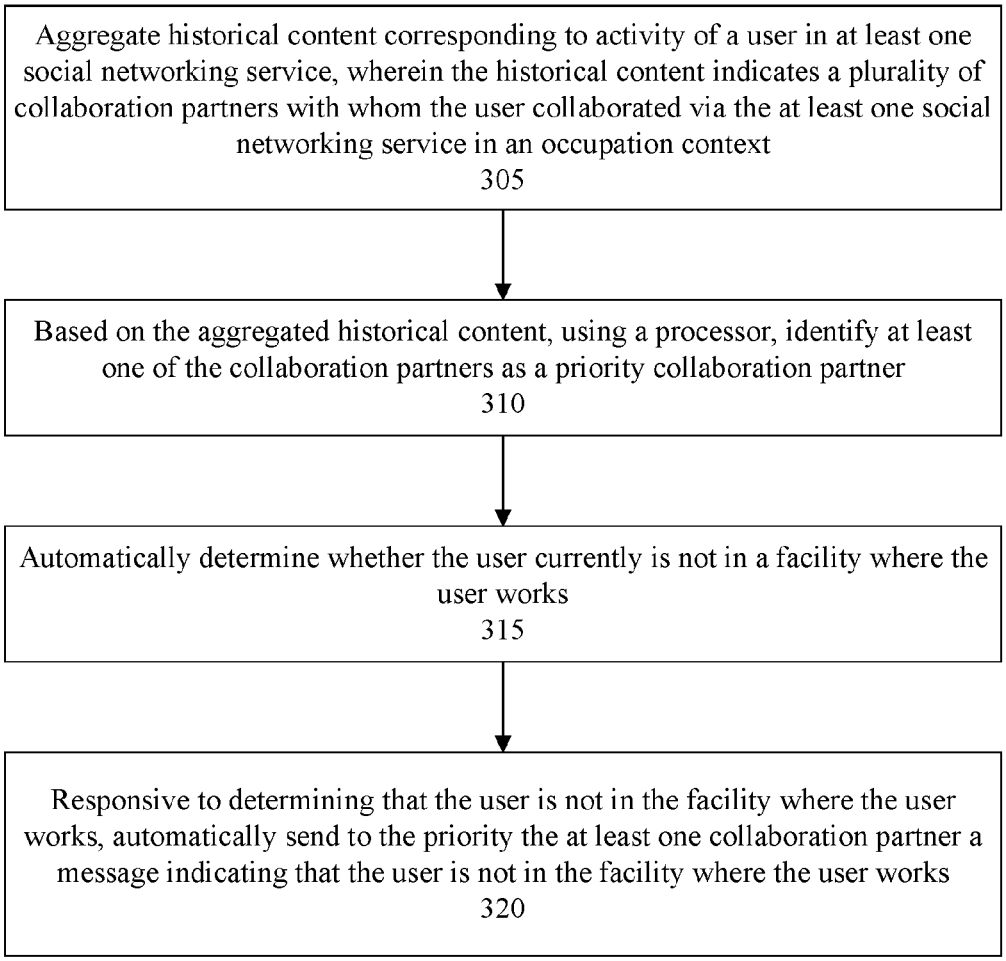
FIG. 3 is a flow chart illustrating an example of a method of sending an out-of-facility notification.

FIG. 3 is a flow chart illustrating an example of a method 300 of sending an out-of-facility notification. At step 305, historical content corresponding to activity of a user in at least one social networking service can be aggregated, wherein the historical content indicates a plurality of collaboration partners with whom the user collaborated via the at least one social networking service in an occupation context. At step 310, based on the aggregated historical content, using a processor, at least one of the collaboration partners can be identified as a priority collaboration partner. At step 315, whether the user currently is not in a facility where the user works can be automatically determined. At step 320, responsive to determining that the user is not in the facility where the user works, a message indicating that the user is not in the facility where the user works can be automatically sent to the at least one priority collaboration partner.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
aggregating content corresponding to a user from at least one task management system, wherein the content indicates at least one task assigned to the user and at least one collaboration partner associated with, affected by or that has an interest in, the at least one task;
aggregating historical content from a social networking service;
determining, using a processor processing the historical content, whether the user has recently and frequently communicated with the at least one collaboration partner in an occupation context using the social networking service;
determining, using the processor processing the historical content, a subject of, or content contained in, at least one communication exchanged between the user and the at least one collaboration partner in the occupation context using the social networking service;
analyzing an organizational hierarchy to identify a position of the collaboration partner in the organizational hierarchy, analyzing the organizational hierarchy comprising determining whether the collaboration partner is assigned to a same team and a same department as the user;
based on the aggregated content from the at least one task management system, and responsive to determining that the user has recently and frequently communicated with the at least one collaboration partner in an occupation context using the social networking service, determining the subject of, or content contained in, the at least one communication exchanged between the user and the at least one collaboration in the occupation context using the social networking service and the collaboration partner's position in the organizational hierarchy, identifying, using the processor, the at least one collaboration partner as a priority collaboration partner;
automatically determining whether the user currently is not in a facility where the user works; and
responsive to determining that the user is not in the facility where the user works, automatically sending to the priority collaboration partner a message indicating that the user is not in the facility where the user works.

2. The method of claim 1, wherein automatically sending to the priority collaboration partner the message indicating that the user is not in the facility comprises:
automatically sending to the priority collaboration partner, via the social networking service, the message indicating that the user is not in the facility.

3. The method of claim 1, wherein automatically sending to the priority collaboration partner the message indicating that the user is not in the facility comprises:
automatically sending to the priority collaboration partner, via an e-mail or text messaging, the message indicating that the user is not in the facility.

4. The method of claim 1, wherein identifying the at least one collaboration partner as a priority collaboration partner further is based on at least one parameter specified by the user.

5. The method of claim 1, wherein analyzing the organizational hierarchy to identify the position of the collaboration partner in the organizational hierarchy comprises:
determining whether the collaboration partner is on a same level as the user in the organizational hierarchy.

6. A system, comprising:
a processor and memory, the processor programmed to initiate executable operations comprising:
aggregating content corresponding to a user from at least one task management system, wherein the content indicates at least one task assigned to the user and at least one collaboration partner associated with, affected by or that has an interest in, the at least one task;
aggregating historical content from a social networking service;
determining, by processing the historical content, whether the user has recently and frequently communicated with the at least one collaboration partner in an occupation context using the social networking service;
determining, by processing the historical content, a subject of, or content contained in, at least one communication exchanged between the user and the at least one collaboration partner in the occupation context using the social networking service;
analyzing an organizational hierarchy to identify a position of the collaboration partner in the organizational hierarchy, analyzing the organizational hierarchy comprising determining whether the collaboration partner is assigned to a same team and a same department as the user;

based on the aggregated content from the at least one task management system, and responsive to determining that the user has recently and frequently communicated with the at least one collaboration partner in an occupation context using the social networking service, determining the subject of, or content contained in, the at least one communication exchanged between the user and the at least one collaboration in the occupation context using the social networking service and the collaboration partner's position in the organizational hierarchy, identifying the at least one collaboration partner as a priority collaboration partner;

automatically determining whether the user currently is not in a facility where the user works; and responsive to determining that the user is not in the facility where the user works, automatically sending to the priority collaboration partner a message indicating that the user is not in the facility where the user works.

7. The system of claim 6, wherein automatically sending to the priority collaboration partner the message indicating that the user is not in the facility comprises:

automatically sending to the priority collaboration partner, via the social networking service, the message indicating that the user is not in the facility.

8. The system of claim 6, wherein automatically sending to the priority collaboration partner the message indicating that the user is not in the facility comprises:

automatically sending to the priority collaboration partner, via an e-mail or text messaging, the message indicating that the user is not in the facility.

9. The system of claim 6, wherein identifying the at least one collaboration partner as a priority collaboration partner further is based on at least one parameter specified by the user.

10. The system of claim 6, wherein analyzing the organizational hierarchy to identify the position of the collaboration partner in the organizational hierarchy comprises:

determining whether the collaboration partner is on a same level as the user in the organizational hierarchy.

11. A computer program product comprising a computer readable storage device having program code stored thereon, the program code executable by a processor to perform a method comprising:

aggregating, by the processor, content corresponding to a user from at least one task management system, wherein the content indicates at least one task assigned to the user and at least one collaboration partner associated with, affected by or that has an interest in, the at least one task;

aggregating, by the processor, historical content from a social networking service;

determining, by the processor processing the historical content, whether the user has recently and frequently communicated with the at least one collaboration partner in an occupation context using the social networking service;

determining, by the processor processing the historical content, a subject of, or content contained in, at least one communication exchanged between the user and the at least one collaboration partner in the occupation context using the social networking service;

analyzing, by the processor, an organizational hierarchy to identify a position of the collaboration partner in the organizational hierarchy, analyzing the organizational hierarchy comprising determining whether the collaboration partner is assigned to a same team and a same department as the user;

based on the aggregated content from the at least one task management system, and responsive to determining that the user has recently and frequently communicated with the at least one collaboration partner in an occupation context using the social networking service, determining the subject of, or content contained in, the at least one communication exchanged between the user and the at least one collaboration in the occupation context using the social networking service and the collaboration partner's position in the organizational hierarchy, identifying, by the processor, the at least one collaboration partner as a priority collaboration partner;

automatically determining, by the processor, whether the user currently is not in a facility where the user works; and responsive to determining that the user is not in the facility where the user works, automatically sending to the priority collaboration partner, by the processor, a message indicating that the user is not in the facility where the user works.

12. The computer program product of claim 11, wherein automatically sending to the priority collaboration partner the message indicating that the user is not in the facility comprises:

automatically sending to the priority collaboration partner, via the social networking service, the message indicating that the user is not in the facility.

13. The computer program product of claim 11, wherein automatically sending to the priority collaboration partner the message indicating that the user is not in the facility comprises:

automatically sending to the priority collaboration partner, via an e-mail or text messaging, the message indicating that the user is not in the facility.

14. The computer program product of claim 11, wherein identifying the at least one collaboration partner as a priority collaboration partner further is based on at least one parameter specified by the user.

* * * * *